United States Patent [19]

Pottebaum

[11] Patent Number: 4,958,118
[45] Date of Patent: Sep. 18, 1990

[54] WIDE RANGE, SELF-STARTING SINGLE PHASE MOTOR SPEED CONTROL

[75] Inventor: Joseph R. Pottebaum, Brookfield, Wis.

[73] Assignee: A. O. Smith Corporation, Milwaukee, Wis.

[21] Appl. No.: 399,231

[22] Filed: Aug. 28, 1989

[51] Int. Cl.⁵ .......................... H02P 5/34; H02P 5/40
[52] U.S. Cl. .................................. 318/727; 318/786; 318/778; 318/785; 318/799
[58] Field of Search .............. 318/727, 728, 729, 733, 318/745, 746, 753, 754, 755, 772, 773, 774, 775, 776, 777, 778, 779, 782, 785, 786, 787, 794, 795, 796, 803, 805, 806, 807, 808, 809, 810, 811, 812, 254, 138, 439

[56] References Cited

U.S. PATENT DOCUMENTS

| | | | |
|---|---|---|---|
| 4,110,671 | 8/1978 | Roger | 318/798 |
| 4,271,386 | 6/1981 | Lee | 318/729 |
| 4,489,263 | 12/1984 | Potter et al. | 318/727 |
| 4,604,563 | 8/1986 | Min | 318/786 |
| 4,622,506 | 11/1986 | Shemanske et al. | 318/786 |
| 4,658,195 | 4/1987 | Min | 318/778 X |
| 4,670,697 | 6/1987 | Wregge et al. | 318/786 |
| 4,687,982 | 8/1987 | Palaniappan | 318/778 X |
| 4,719,399 | 1/1988 | Wrege | 318/786 |
| 4,751,449 | 6/1988 | Chmiel | 318/786 |
| 4,751,450 | 6/1988 | Lorenz et al. | 318/786 |
| 4,782,278 | 11/1988 | Bossi et al. | 318/786 |
| 4,786,850 | 11/1988 | Chmiel | 318/785 X |
| 4,801,858 | 1/1989 | Min | 318/786 |
| 4,806,838 | 2/1989 | Weber | 318/729 |
| 4,823,067 | 4/1989 | Weber | 318/777 X |
| 4,862,053 | 8/1989 | Jordan et al. | 318/785 X |

Primary Examiner—William M. Shoop, Jr.
Assistant Examiner—Paul Ip
Attorney, Agent, or Firm—Andrus, Sceales, Starke & Sawall

[57] ABSTRACT

A speed control circuit (50) for a single phase AC induction motor (12) includes a phase control circuit (10) for connecting a main winding (16) to an AC source (18) at a variable time delay phase angle during the half cycle of the AC source, and a boost circuit (52) including a motor speed sensor (54, 56) sensing motor speed and altering the delay interval phase angle in response thereto. The boost circuit shortens the delay interval in response to decreasing motor speed, and lengthens the delay interval in response to increasing motor speed, such that almost full voltage is applied during starting of the motor, which voltage is reduced as the motor begins running.

16 Claims, 2 Drawing Sheets

WIDE RANGE, SELF-STARTING SINGLE PHASE MOTOR SPEED CONTROL

BACKGROUND AND SUMMARY

The invention relates to a speed control circuit for a single phase AC induction motor.

In single phase AC induction motors, it is known in the prior art to reduce the terminal voltage while at line frequency to control motor speed. Various methods are known in the prior art for varying the voltage, including the use of rheostats, variable voltage transformers, and thyristor phase controls. Reducing the terminal voltage reduces the flux in the motor, therefore, the motor must slip more to produce the rotor current necessary to maintain torque and the motor slows down. However, the torque produced is the product of the flux and the rotor current. So if the torque required by the load is not also decreasing, then the motor's internal impedance will not support the rotor current and the motor stops.

Starting a stopped motor requires more voltage than running a motor. This poses a practical limit on the speed range of this type of motor speed controller.

A triac phase control system is known in the prior art and is often applied to single phase shaded pole and permanent split capacitor motors driving fans, blowers and centrifugal pumps. The triac phase control typically has a two to one voltage range and about the same speed range. The motor generally won't start with less than half the rated voltage.

A triac phase control controls the phase angle during the half cycle of the AC power supply at which the triac turns on. A capacitor is charged through one or more rheostats to a given threshold voltage which triggers the triac. Reducing the resistance of the rheostats increases the current into the capacitor, which decreases the time delay interval in firing the triac, and increases the voltage across the motor.

The present invention overcomes the starting and speed range limitations in the prior art. The invention provides an additional boost circuit for the triac phase control and starts the motor with almost full voltage and subsequently reduces the voltage as the motor begins running.

DETAILED DESCRIPTION

Prior Art

Figure 1:
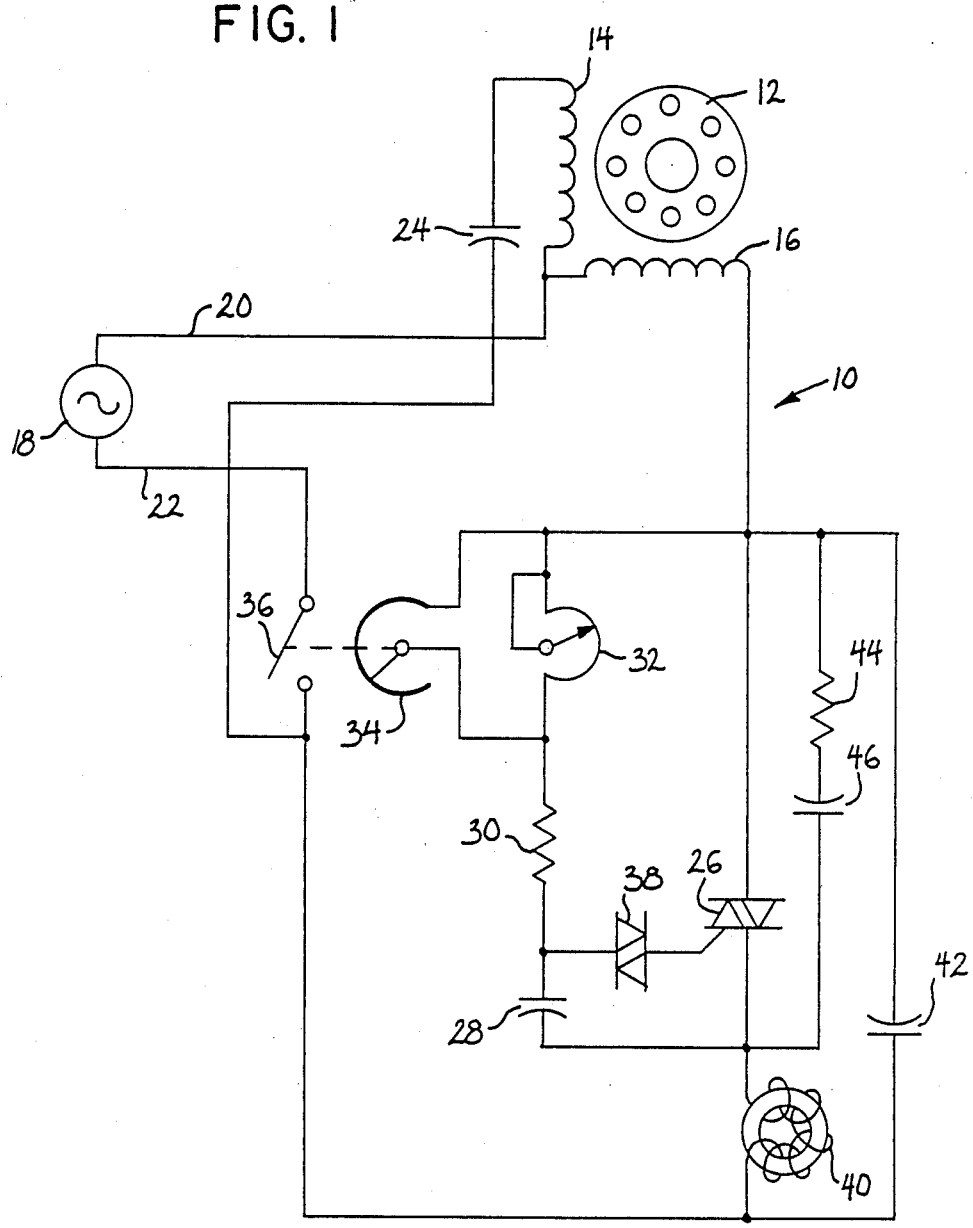
FIG. 1 is a circuit diagram showing a phase control circuit known in the prior art.

FIG. 1 shows a phase control circuit 10 for a single phase AC induction motor 12 having an auxiliary winding 14 and a main winding 16 both connectable to an AC power source 18 having first and second conductors 20 and 22. Windings 14 and 16 provide a phase shifted rotating magnetic field to produce starting and/or running torque. In a capacitor run type motor, run capacitor 24 is connected in series with auxiliary winding 14.

A solid state switch provided by triac 26 connects and disconnects main winding 16 from AC source 22 at a variable time during a half cycle of the AC source. Capacitor 28 is charged by current through resistor 30 and parallel rheostats 32 and 34. Rheostat 32 provides a minimum current preset. Rheostat 34 is adjustable by the user to vary the charging current into capacitor 28. When the adjustment knob on rheostat 34 is turned all the way to its maximum resistance value, then switch 36 is opened, disconnecting triac 26 from AC source 18 at conductor 22.

When capacitor 28 is charged to a given threshold, then it breaks over diac 38 and triggers triac 26 into conduction, which connects main winding 16 to AC source 18 for the balance of the half cycle. By reducing the resistance of rheostat 34, capacitor 28 charges more quickly to the given threshold, such that triac 26 is triggered into conduction at an earlier point in the half cycle, to thus apply more voltage from AC source 18 to main winding 16, and hence increase motor speed. Main winding 16 is thus connected to AC source 18 at a variable time during a half cycle of the AC source. Capacitor 28 delays connection of main winding 16 to AC source 18 for a variable delay interval following the beginning of the half cycle, such that main winding 16 is disconnected from AC source 18 during the delay interval during an initial portion of the half cycle, and is connected to AC source 18 during the remaining portion of the half cycle. The shorter the delay interval the longer the connection time of main winding 16 to AC source 18 and the greater the voltage applied to main winding 16 and the greater the torque developed by the motor, which increases motor speed. Inductor 40 is provided in series with triac 28 and together with capacitor 42 provides an electromagnetic interference filter. Resistor 44 and capacitor 46 provide a snubber circuit to aid conduction immediately after zero crossings and to prevent retriggering of triac 28 due to high dV/dt after current stops flowing.

Present Invention

Figure 2:
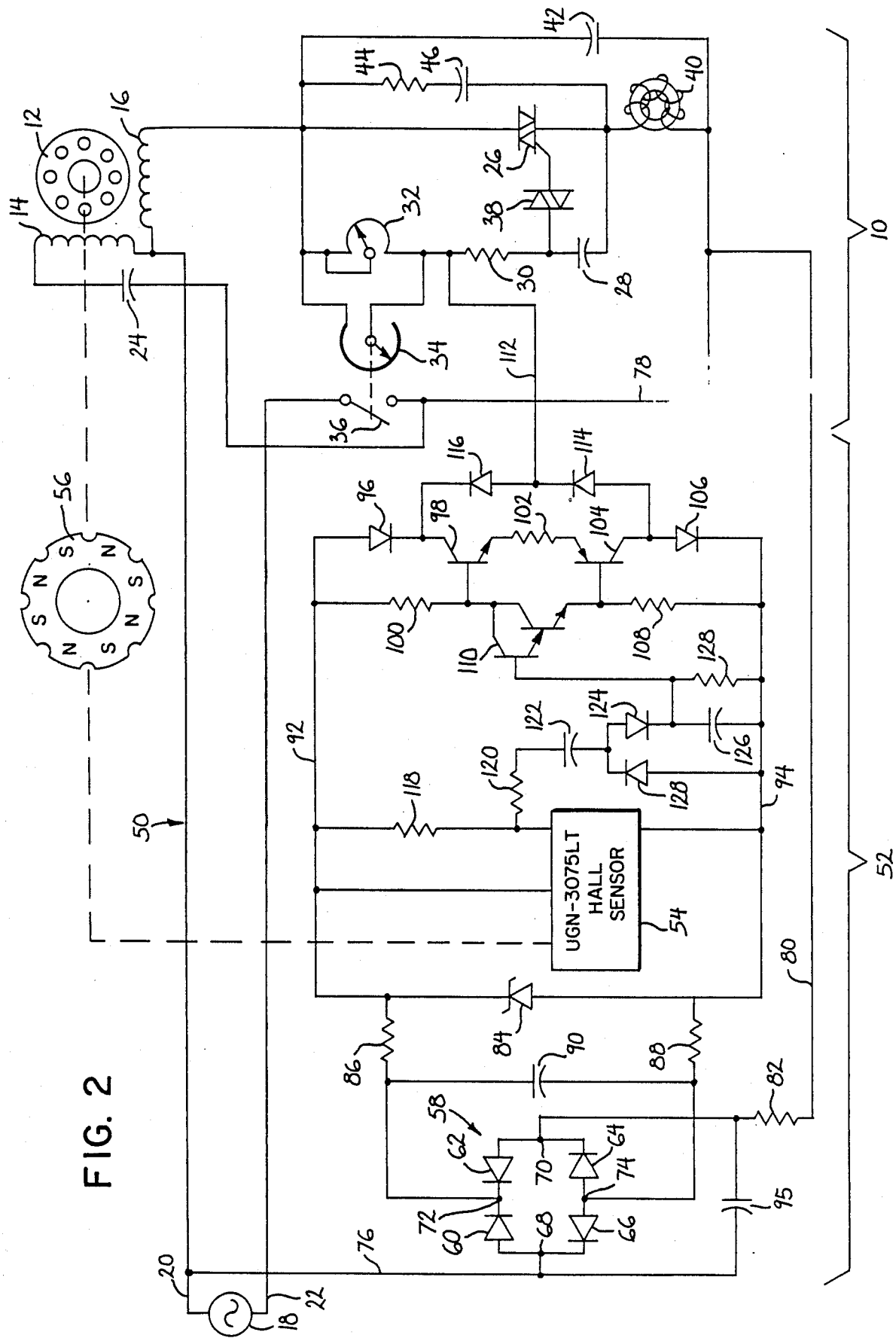
FIG. 2 is a circuit diagram showing a speed control circuit in accordance with the present invention.

FIG. 2 shows speed control circuit 50 in accordance with the present invention, and uses like reference numerals from FIG. 1 where appropriate to facilitate understanding. Circuit 50 includes the phase control circuit 10 of FIG. 1 and also includes a boost circuit 52 including a speed sensor 54 provided by a Sprague UGN-3075LT Hall sensor sensing motor speed and altering the noted delay interval during which capacitor 28 is charged to the given threshold to provide the phase angle for firing triac 26. The Hall sensor senses a magnetic wheel 56 on the motor shaft providing magnetic pulses for each pole change during rotation of the motor, the frequency of which increases with increasing motor speed. Other speed sensors may be used, such as a variable reluctance wheel, such as a steel gear and a Hall effect switch with a magnet, a variable reluctance wheel and a magnetic pick-up including a coil of wire wrapped around a permanently magnetized iron rod with appropriate amplification circuitry, a magnetic wheel and a nonmagnetized pick-up coil to detect flux transistions, an optical sensor with a light source and a wheel with holes in it to alternately block and transmit light, a permanently magnetized magnetic pick-up coil detecting one or more key-ways in the motor shaft, etc.

Conductor 20 from AC source 18 is connected to a diode bridge 58 provided by diodes 60, 62, 64, and 66, and having diode bridge inputs 68 and 70, and diode bridge outputs 72 and 74. AC conductor 20 is connected by conductor 76 to diode bridge input 68. AC conductor 22 is connected through switch 36 when closed and conductor 78 and conductor 80 and current limiting resistor 82 to the other diode bridge 70. Zener diode 84 is connected across diode bridge outputs 72 and 74 through current limiting resistors 86 and 88 to establish a reference voltage for boost circuit 52. Capacitor 90 is connected across DC bridge outputs 72 and 74 and provides a DC power supply capacitor. The DC power supply voltage from capacitor 90 is provided through resistor 86 on conductor 92, and through resistor 88 on conductor 94. Capacitor 95 across diode bridge inputs 68 and 70 provides a bypass noise filter.

Conductor 92 is connected through diode 96 to the collector of bipolar NPN transistor 98. Conductor 92 is connected through resistor 100 to the base of transistor 98. The emitter of transistor 98 is connected through resistor 102 to the emitter of bipolar PNP transistor 104. The collector of transistor 104 is connected through diode 106 to conductor 94. The base of transistor 104 is connected through resistor 108 to conductor 94. Transistors 98 and 104 are connected in series aiding relation, with resistor 102 connected in series therebetween. A Darlington transistor 110 has its collector-emitter circuit connected between the bases of transistors 98 and 104.

Transistor 110 is nonconductive at initial startup of the motor, to be described. When transistor 110 is nonconductive, the bases of transistors 98 and 104 are not connected to each other. In this mode, transistors 98 and 104 are conductive and apply a known voltage across resistor 102. The known voltage is the reference voltage provided by the DC power supply, including capacitor 90, as set by zener diode 84. This known reference voltage across resistor 102 supplies a known current through conductor 112 to supply additional charging current to capacitor 28 to decrease the delay interval before firing of triac 26, to thus apply greater line voltage to auxiliary winding 16 and hence increase motor speed.

When AC conductor 20 is positive with respect to AC conductor 22, current flows from AC conductor 20 through conductor 76 to diode bridge input 68 through diode 60 to diode bridge output 72 through resistor 86 through conductor 92 through diode 96 through transistor 98 through resistor 102 through transistor 104 through diode 114 through conductor 112 through resistor 30 to charge capacitor 28 with additional boost current, and is returned through inductor 40 through conductor 78 through closed switch 36 to AC conductor 22. The positive voltage on conductor 92, connected by means of resistor 100 to the base of transistor 98, with respect to the emitter of transistor 98 biases NPN transistor 98 into conduction. The negative voltage on conductor 94, connected by means of resistor 108 to the base of transistor 104, with respect to the emitter of transistor 104 biases PNP transistor 104 into conduction.

When AC conductor 22 is positive with respect to AC conductor 20, current flows from AC conductor 22 through closed switch 36 through conductor 78 through inductor 40 to charge capacitor 28 and is returned through resistor 30 through conductor 112 through diode 116 through transistor 98 through resistor 102 through transistor 104 through diode 106 through conductor 94 through resistor 88 to diode bridge output 74 through diode 66 through conductor 76 to AC conductor 20. The positive voltage on conductor 92, connected by means of resistor 100 to the base of transistor 98, with respect to the emitter of transistor 98 biases NPN transistor 98 into conduction. The negative voltage on conductor 94, connected by means of resistor 108 to the base of transistor 104, with respect to the emitter of transistor 104 biases PNP transistor 104 into conduction.

The noted DC supply across conductors 92 and 94 provides the base to emitter biasing voltages for conduction of transistor 98 and 104, as noted above. Transistors 98 and 104 and resistor 102 provide a common path for the same direction of current flow therethrough during both half cycles of AC source 18. Resistor 102 provides a current control resistor providing symmetrical control of the charging current additionally provided to capacitor 28 during each polarity half cycle. Conductivity of transistors 98 and 104 modulates this additional boost charging current.

As motor speed increases, transistor 110 becomes more conductive, to be described. When transistor 110 is fully conductive, it connects the bases of transistors 98 and 104 together to maintain the bases at the same potential, which in turn prevents conduction of transistors 98 and 104. When transistors 98 and 104 are nonconductive, no boost current is supplied through conductor 112 to capacitor 28, such that charging of the latter is controlled solely by rheostats 32 and 34, with no additional boost current from boost circuit 52. Hence, the delay interval in the phase angle of firing of triac 26 is the same as in FIG. 1, which is controlled by the operator by adjustment of rheostat 34.

Hall sensor 54 changes between conductive and nonconductive states with each pole transition of magnetic wheel 56. When Hall sensor 54 is conductive, current flows from conductor 92 through resistor 118 through Hall sensor 54 to conductor 94. When Hall sensor 54 is nonconductive, current flows from conductor 92 through resistor 118 through resistor 120 through capacitor 122 through diode 124 through capacitor 126 to conductor 94, thus charging capacitors 122 and 126. At the next magnetic transition of wheel 56, Hall sensor 54 switches back to its conductive state, and capacitor 122 discharges through resistor 120, Hall sensor 54 and diode 128. Capacitor 126 does not discharge through resistor 120 and Hall sensor 54 because of blocking diode 124. At the next magnetic transition of wheel 56, Hall sensor 54 again switches to its nonconductive state, to again charge capacitors 122 and 126. Since capacitor 122 was previously discharged, it begins charging from its lower discharged level. However, since capacitor 126 was not discharged with capacitor 122, capacitor 126 begins charging from a higher level, which was the previously charged state less any charge bled through resistor 128. Additional charge is thus added to capacitor 126. After repeated magnetic transitions of wheel 56 and on-off switching of Hall sensor 54, capacitor 126 will cummulatively charge to higher values, in turn providing increasing bias on the base of transistor 110, in turn increasing the conductivity of transistor 110 and eventually reaching a given threshold to trigger transistor 110 to a fully conductive state, which in turn renders transistors 98 and 104 nonconductive, which in turn terminates the additional boost current supplied to capacitor 28 in phase control circuit 10. Bleed resistor 128 is connected across capacitor 126 and discharges capacitor 126 at a rate proportional to the accumulated charge on capacitor 126.

When transistor 110 is not conductive, then the AC line voltage as provided through diode bridge 58 and DC power supply capacitor 90 across conductors 92 and 94 is applied across current control resistor 102 establishing the initial and blocked-rotor charging current for phase control capacitor 28. The value of resistor 102 is chosen to make such current sufficiently large to cause triac 26 to fire early in the half cycle, applying almost full line voltage to the motor's main winding 16 to give it full starting torque. Transistor 110 provides a throttle to reduce such charging current by reducing the voltage across current control resistor 102. When transistor 110 is fully on, almost no current flows out of boost circuit 52 on conductor 112 to capacitor 28.

It is recognized that various equivalents, alternatives and modifications are possible within the scope of the appended claims.

I claim:

1. A speed control circuit for a single phase AC induction motor having a main winding and an auxiliary winding both connectable to an AC power source, comprising a phase control circuit for connecting said main winding to said AC source at a variable time during a half cycle of said AC source, and including delay means delaying connection of said main winding to said AC source for a variable delay interval following the beginning of the half cycle, such that said main winding is disconnected from said AC source during said delay interval during an initial portion of the half cycle, and is connected to said AC source during the remaining portion of the half cycle, such that the shorter the delay interval the longer the connection time of said main winding to said AC source and the greater the voltage applied to said main winding and the greater the torque developed by the motor, a boost circuit including speed sensor means sensing motor speed and altering said delay interval in response thereto.

2. The invention according to claim 1 wherein said boost circuit comprises means shortening said delay interval in response to decreasing motor speed, and lengthening said delay interval in response to increasing motor speed.

3. A speed control circuit for a single phase AC induction motor having a main winding and an auxiliary winding both connectable to an AC power source, comprising a phase control circuit including a solid state switch for connecting said main winding to said AC source at a variable time during a half cycle of said AC source, and capacitor means charged by current from said AC source to a given threshold charge to trigger said solid state switch into conduction to connect said main winding to said AC source, means for varying the charging time of said capacitor means to said given threshold to variably delay connection of said main winding to said AC source for a variable delay interval following the beginning of the half cycle until said capacitor means charges to said given threshold charge, such that said main winding is disconnected from said AC source during said delay interval during an initial portion of the half cycle, and is connected to said AC source during the remaining portion of the half cycle, such that the shorter the delay interval the longer the connection time of said main winding to said AC source and the greater the voltage applied to said main winding and the greater the torque developed by the motor, a boost circuit comprising speed sensor means sensing motor speed and supplying additional charging current to said capacitor means in response to decreasing motor speed, to thus shorten the charging time of said capacitor means to said given threshold charge and hence shorten said delay interval.

4. The invention according to claim 3 wherein said boost circuit comprises transistor means modulating current flow from said AC source to said capacitor means in response to motor speed.

5. The invention according to claim 4 wherein said transistor means comprises a pair of transistors connected in series aiding relation with a current control resistor connected in series therebetween, said transistors and said current control resistor providing a common path in the same direction of current flow therethrough for both positive and negative half cycles of said AC source for current flow between said AC source and said capacitor means, whereby to provide symmetrical control of additional charging current supplied to said capacitor means by said boost circuit.

6. The invention according to claim 5 wherein said AC source includes a pair of conductors, and comprising a first diode conducting current from one of said conductors of said AC source to the first of said transistors, a second diode conducting current from the second of said transistors to said capacitor means, such that during one half cycle of said AC source, current flows from said one conductor of said AC source through said first diode through said first transistor through said current control resistor through said second transistor through said second diode to said capacitor means and is returned back to the other of said conductors of said AC source, and comprising a third diode conducting current from said capacitor means to said first transistor, a fourth diode conducting current from said second transistor to said one conductor of said AC source, such that during the alternate half cycle of said AC source current flows from said other conductor of said AC source to said capacitor means and is returned through said third diode through said first transistor through said current control resistor through said second transistor through said fourth diode to said one conductor of said AC source.

7. The invention according to claim 6 comprising a third transistor controlling conduction of said first and second transistors.

8. The invention according to claim 7 wherein one of said first and second transistors is a bipolar NPN transistor, and the other of said first and second transistors is a bipolar PNP transistor, and wherein said third transistor has a conductive state connecting the base of said first transistor to the base of said second transistor to prevent requisite base to emitter biasing voltages for said first and second transistor such that the latter are nonconductive and block the supply of additional boost current from said AC source to said capacitor means, said third transistor being biased into conduction by said speed sensor means in response to increasing motor speed.

9. The invention according to claim 8 comprising fifth, sixth, seventh and eighth diodes forming a diode bridge, said bridge having a first input connected to said one conductor of said AC source, a second input connected to said other conductor of said AC source, a first output connected through said first diode to said first transistor, and a second output connected through said fourth diode to said second transistor, and second capacitor means connected across said first and second outputs of said bridge and providing a DC power supply providing base to emitter biasing voltages for said first and second transistors.

10. The invention according to claim 9 wherein said first transistor is an NPN transistor, said second transistor is a PNP transistor, said first output of said diode bridge is connected to the positive side of said DC power supply and to the anode of said first diode, the cathode of said first diode is connected to the collector of said first transistor, and comprising a second resistor connected between the anode of said first diode and the base of said first transistor, and wherein said second output of said diode bridge is connected to the negative side of said DC power supply and to the cathode of said fourth diode, the anode of said fourth diode is connected to the collector of said second transistor, and comprising a third resistor connected between the cathode of said fourth diode and the base of said second transistor, and wherein said third transistor comprises a bipolar transistor having its emitter-collector circuit connected in series between the bases of said first and second transistors.

11. A speed control circuit for a single phase AC induction motor having a main winding and an auxiliary winding both connectable to an AC power source, comprising a phase control circuit including a solid state switch for connecting said main winding to said AC source at a variable time during a half cycle of said AC source, capacitor means charged by current from said AC source to a given threshold charge to trigger said solid state switch into conduction to connect said main winding to said AC source, means for varying the charging time of said capacitor means to said given threshold to variably delay connection of said main winding to said AC source for a variable delay interval following the beginning of the half cycle until said capacitor means charges to said given threshold charge, such that said main winding is disconnected from said AC source during said delay interval during an initial portion of the half cycle, and is connected to said AC source during the remaining portion of the half cycle, such that the shorter the delay interval the longer the connection time of said main winding to said AC source and the greater the voltage applied to said main winding and the greater the torque developed by the motor, a boost circuit comprising speed sensor means sensing motor speed and supplying additional charging current to said capacitor means in response to decreasing motor speed, to thus shorten the charging time of said capacitor means to said given threshold charge and hence shorten said delay interval, said boost circuit comprising first and second transistors connected in series aiding relation and modulating current flow from said AC source to said capacitor means in response to motor speed, a current control resistor connected in series between said transistors, said transistors and said current control resistor providing a common path in the same direction of current flow therethrough for both positive and negative half cycles of said AC current for current flow between said AC source and said capacitor means, whereby to provide symmetrical control of additional charging current supplied to said capacitor means by said boost circuit, wherein said AC source includes a pair of conductors, and comprising a first diode conducting current from one of said conductors of said AC source to said first transistor, a second diode conducting current from said second transistor to said capacitor means, such that during one half cycle of said AC source, current flows from said one conductor of said AC source through said first diode through said first transistor through said current control resistor through said second transistor through said second diode to said capacitor means and is returned back to the other of said conductors of said AC source, and comprising a third diode conducting current from said capacitor means to said first transistor, a fourth diode conducting current from said second transistor to said one conductor of said AC source, such that during the alternate half cycle of said AC source current flows from said other conductor of said AC source to said capacitor means and is returned through said third diode through said first transistor through said current control resistor through said second transistor through said fourth diode to said one conductor of said AC source, and comprising a third transistor controlling conduction of said first and second transistors, and second capacitor means charged by current from said AC source to a given threshold to trigger said third transistor into conduction in response to increasing motor speed.

12. The invention according to claim 11 wherein said speed sensor means comprises a speed responsive switch switching between conductive and nonconductive states at an increasing frequency in response to increasing engine speed, and comprising third capacitor means charged by current from said AC source during one of said states of said speed switch means and discharged during the other state of said speed switch means, and comprising a charge diode connected between said third and second capacitor means such that charging of said third capacitor means also charges said second capacitor means but blocks discharge of said second capacitor means through said third capacitor means when the latter is discharging, such that during charging of said third capacitor means, said second capacitor means is also charged, and during discharge of said third capacitor means, the charge on said second capacitor means remains, such that during the next charging of said third capacitor means, additional charge is provided to said second capacitor means to raise the charge thereof to a higher level, such that each charging of said third capacitor means adds further charge to said second capacitor means such that the latter cummulatively reaches said given threshold to trigger said third transistor into conduction.

13. The invention according to claim 12 comprising a discharge diode connected between said speed sensitive switch and said third capacitor means, the anode of said charge diode being connected to the cathode of said discharge diode and to said third capacitor means, the cathode of said charge diode being connected to said second capacitor means, the anode of said discharge diode being connected to said speed switch means.

14. The invention according to claim 13 wherein said third transistor comprises a bipolar Darlington transistor having a base connected to the cathode of said charge diode.

15. The invention according to claim 14 comprising a bleed resistor connected across said second capacitor means and discharging said second capacitor means at a rate proportional to the accumulated charge on said second capacitor means.

16. A speed control circuit for a single phase AC induction motor having a main winding and an auxiliary winding both connectable to an AC power source, comprising a phase control circuit including a solid state switch for connecting said main winding to said AC source at a variable time during a half cycle of said AC source, first capacitor means charged by current from said AC source to a given threshold charge to trigger said solid state switch into conduction to connect said main winding to said AC source, means for varying the charging time of said first capacitor means to said given threshold to variably delay connection of said main winding to said AC source for a variable delay interval following the beginning of the half cycle until said first capacitor means charges to said given threshold charge, such that said main winding is disconnected from said AC source during said delay interval during an initial portion of the half cycle, and is connected to said AC source during the remaining portion of the half cycle, such that the shorter the delay interval the longer the connection time of said main winding to said AC source and the greater the voltage applied to said main winding and the greater the torque developed by the motor, a boost circuit comprising speed sensor means sensing motor speed and supplying additional charging current to said first capacitor means in response to decreasing engine speed, to thus shorten the charging time of said first capacitor means to said given threshold charge and hence shorten said delay interval, wherein said boost circuit comprises transistor means modulating current flow from said AC source to said first capacitor means in response to motor speed, wherein said transistor means comprises a pair of transistors connected in series aiding relation with a current control resistor connected in series therebetween, said transistors and said current control resistor providing a common path in the same direction of current flow therethrough for both positive and negative half cycles of said AC source for current flow between said AC source and said first capacitor means, whereby to provide symmetrical control of additional charging current supplied to said first capacitor means by said boost circuit, wherein said AC source includes a pair of conductors, and comprising a first diode conducting current from one of said conductors of said AC source to the first of said transistors, a second diode conducting current from the second of said transistors to said first capacitor means, such that during one half cycle of said AC source, current flows from said one conductor of said AC source through said first diode through said first transistor through said current control resistor through said second transistor through said second diode to said first capacitor means and is returned back to the other of said conductors of said AC source, and comprising a third diode conducting current from said first capacitor means to said first transistor, a fourth diode conducting current from said second transistor to said one conductor of said AC source, such that during the alternate half cycle of said AC source current flows from said other conductor of said AC source to said first capacitor means and is returned through said third diode through said first transistor through said current control resistor through said second transistor through said fourth diode to said one conductor of said AC source, and comprising a third transistor controlling conduction of said first and second transistors, wherein one of said first and second transistors is a bipolar NPN transistor, and the other of said first and second transistors is a bipolar PNP transistor, and wherein said third transistor has a conductive state connecting the base of said first transistor to the base of said second transistor to prevent requisite base to emitter biasing voltages for said first and second transistor such that the latter are nonconductive and block the supply of additional boost current from said AC source to said first capacitor means, said third transistor being biased into conduction by said speed sensor means in response to increasing motor speed, and comprising fifth, sixth, seventh and eighth diodes forming a diode bridge, said bridge having a first input connected to said one conductor of said AC source, a second input connected to said other conductor of said AC source, a first output connected through said first diode to said first transistor, and a second output connected through said fourth diode to said second transistor, and second capacitor means connected across said first and second outputs of said bridge and providing a DC power supply providing base to emitter biasing voltages for said first and second transistors, and comprising third capacitor means charged by current from said AC source to a given threshold to trigger said third transistor into conduction in response to increasing engine speed, wherein said speed sensor means comprises a speed responsive switch switching between conductive and nonconductive states at an increasing frequency in response to increasing engine speed, and comprising fourth capacitor means charged by current from said AC source during one of said states of said speed switch means and discharged during the other state of said speed switch means, and comprising a charge diode connected between said fourth and third capacitor means such that charging of said fourth capacitor means also charges said third capacitor means but blocks discharge of said third capacitor means through said fourth capacitor means when the latter is discharging, such that during charging of said fourth capacitor means, said third capacitor means is also charged, and during discharge of said fourth capacitor means, the charge on said third capacitor means remains, such that during the next charging of said fourth capacitor means, additional charge is provided to said third capacitor means to raise the charge thereof to a higher level, such that each charging of said fourth capacitor means adds further charge to said third capacitor means such that the latter cummulatively reaches said given threshold to trigger said third transistor into conduction.

* * * * *